(12) United States Patent
Mak

(10) Patent No.: US 8,196,413 B2
(45) Date of Patent: Jun. 12, 2012

(54) CONFIGURATIONS AND METHODS FOR THERMAL INTEGRATION OF LNG REGASIFICATION AND POWER PLANTS

(75) Inventor: John Mak, Santa Ana, CA (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 1077 days.

(21) Appl. No.: 11/908,770

(22) PCT Filed: Mar. 21, 2006

(86) PCT No.: PCT/US2006/010380
§ 371 (c)(1),
(2), (4) Date: May 1, 2008

(87) PCT Pub. No.: WO2006/104800
PCT Pub. Date: Oct. 5, 2006

(65) Prior Publication Data
US 2008/0276617 A1 Nov. 13, 2008

Related U.S. Application Data

(60) Provisional application No. 60/667,182, filed on Mar. 30, 2005.

(51) Int. Cl.
*F02C 1/00* (2006.01)
(52) U.S. Cl. .......................... 60/775; 60/39.182; 60/728
(58) Field of Classification Search ............... 60/39.182, 60/39.465, 39.53, 39.59, 728, 775
See application file for complete search history.

(56) References Cited

U.S. PATENT DOCUMENTS

| | | | |
|---|---|---|---|
| 3,978,663 A * | 9/1976 | Mandrin et al. ................. | 60/728 |
| 4,036,028 A * | 7/1977 | Mandrin ........................ | 62/50.3 |
| 4,418,527 A | 12/1983 | Schlom et al. | |
| 5,758,502 A | 6/1998 | Utamura et al. | |
| 5,782,093 A | 7/1998 | Yamashita et al. | |

* cited by examiner

*Primary Examiner* — Louis Casaregola
(74) *Attorney, Agent, or Firm* — Fish & Associates, PC

(57) ABSTRACT

Contemplated plants integrate regeneration of a freeze point depressant with LNG regasification and a power cycle. Most preferably, the plant is a combined cycle plant in which heat for reboiling the regenerator is provided by the steam cycle, and in which LNG refrigeration content is used to condense steam from the regenerator and to further subcool intake air for a combustion turbine.

20 Claims, 2 Drawing Sheets

CONFIGURATIONS AND METHODS FOR THERMAL INTEGRATION OF LNG REGASIFICATION AND POWER PLANTS

This application claims priority to our copending U.S. provisional patent application with the Ser. No. 60/667,182, which was filed Mar. 30, 2005.

FIELD OF THE INVENTION

The field of the invention is power generation in LNG regasification facilities, and especially thermal integration of regasification in a combined cycle power plant using intake air chilling.

BACKGROUND OF THE INVENTION

Air intake chilling for combustion turbines is well known in the art and various cold sources have been employed. For example, numerous evaporative chillers with and without intermediate heat transfer fluids are described in U.S. Pat. No. 6,457,315. However, such configurations often consume significant quantities of energy for compression/condensation of a refrigerant, and are typically not thermally coupled to an otherwise available source of cold.

In other known configurations, refrigeration content of liquefied natural gas (LNG) is utilized to chill intake air, wherein the air chilling and/or certain other processes contribute to vaporization of LNG in a vaporizer. For example, in one known configuration, as described in U.S. Pat. App. No. 2003/0182941, LNG is used as a refrigerant that is then at least partially routed back to a stratified tank, while another portion is vaporized. In still another known configuration, as taught in U.S. Pat. No. 5,626,019 or EP 0651145, LNG is used as a cold source to cool an intermediary refrigerant for intake air chilling, wherein the so vaporized natural gas is then used as a fuel. Similarly, as described in EP 0605159, inlet air can be cross exchanged with LNG to provide both vaporized fuel and chilled intake air. While such plant configurations typically operate satisfactorily to at least some degree, various disadvantages remain. Among other things, the quantity of regasified LNG is relatively low as compared, for example, with a relatively large volume that is typically required for pipeline transmission.

To overcome such disadvantages, larger quantities of LNG can be regasified using a heat exchange fluid that is (re)heated by heat exchange with turbine intake air and seawater as described in U.S. Pat. No. 6,367,258. In still further known configurations, LNG cold is used as a heat sink in a steam cycle as taught in U.S. Pat. App. No. 2005/0223712. Alternatively, combined cycle plant configurations are also known in which heat from a heat transfer fluid is employed to regasify LNG, and wherein the chilled heat transfer fluid is reheated using intake air chilling and heat from the heat recovery steam generator as described in U.S. Pat. App. No. 2003/0005698, U.S. Pat. No. 6,374,591, EP 0683847, or EP 0828915. Still further known plants integrate LNG regasification with power production and specific demethanizing and/or deethanizing operations as described in WO 2004/109206.

While such configurations often advantageously integrate regasification of LNG with another, typically power generating process, various disadvantages remain. For example, most of these processes are typically limited to cool the gas turbine intake air to 50° F. (or even higher) to avoid water freezing of the intake air, which would create unsafe conditions or even making the power plant inoperable. Therefore, improvements in power generation efficiency using LNG refrigeration content in known plants is typically limited by the cooling limit of the intake air temperature. Moreover, while all or almost all of the currently known gas turbine air pre-cool methods tend to improve the power generation efficiencies in hot climate regions (e.g., in the tropics or subtropics), they are often not suitable in colder climate regions (e.g., northeastern parts of North America). Even in relatively hot climate, such configurations provide very marginal efficiency benefits only in the summer months, with decreasing benefits in the winter seasons. Worse yet, in some cases operation of these known processes must be discontinued when the ambient temperatures drop below 45° F. to avoid water freezing at the air intake and machinery damage by ice blockage.

Therefore, while numerous processes and configurations for power plants with LNG utilization and/or regasification are known in the art, all or almost all of them suffer from one or more disadvantages. Thus, there is still a need to provide improved configurations and methods for power plants with LNG utilization and regasification.

SUMMARY OF THE INVENTION

The present invention is directed to configurations and methods for power plants that include a LNG regasification operation, wherein combustion turbine intake air is subcooled using LNG cold and a freeze point depressant solution, which is regenerated using waste heat from the power generation. The LNG is further heated in exchange with the steam overhead product from the regenerator of the freeze point depressant.

In one aspect of the inventive subject matter, a combined cycle power plant includes a regenerator that is configured to receive a rich freeze point depressant solution (enriched with water or even saturated with water) and that is further configured to form steam and a lean freeze point depressant solution (reduced in water content relative to the rich solution, and most typically water depleted to less than 10%, and most typically less than 5%) from the rich solution. Most preferably, the regenerator is thermally coupled to a heat transfer fluid circuit (e.g., cooled by LNG) such that heat from the regenerator overhead steam is transferred to the heat transfer fluid, and the regenerator is further thermally coupled to a steam cycle such that heat from the steam cycle is transferred to the rich freeze point depressant solution in the regenerator.

Contemplated plants typically further comprise an air intake chiller that is thermally coupled to the LNG-cooled heat transfer fluid circuit, and that is further fluidly coupled to a mixing device, wherein the mixing device is configured to receive the lean freeze point depressant solution and to allow mixing of the lean freeze point depressant solution with air. Preferably, the air-lean freeze point depressant solution mixture is chilled to a temperature of less than 32° F., and most preferably to a temperature of between 20° F. and −40° F. A separator is typically coupled to the air intake chiller and is configured to allow removal the rich freeze point depressant solution from the chilled mixture. Where desirable, a second air intake chiller is thermally coupled to the LNG-cooled heat transfer fluid circuit, and is further upstream and fluidly coupled the first air intake chiller.

In especially preferred aspects, a heat exchanger is configured to allow cooling of the lean freeze point depressant solution using refrigeration content of the rich freeze point depressant solution. It is also preferred that thermal coupling of the regenerator to the steam cycle comprises a circuit that is configured (a) to receive at least partially expanded steam from a steam turbine of the steam cycle, (b) to provide the at least partially expanded steam to a reboiler of the regenerator, and (c) to return the at least partially expanded steam and/or condensate from the regenerator to the steam cycle, and/or that thermal coupling of the regenerator to the LNG-cooled heat transfer fluid circuit comprises a heat exchanger that is configured to provide heat from the steam to the LNG-cooled heat transfer fluid. With respect to the LNG-cooled heat transfer fluid it is generally preferred that such fluid comprises a glycol and/or comprises a multi-component refrigerant. Similarly, it is typically preferred that the lean freeze point depressant solution comprises a glycol or any other solution with water absorption capacity at 32° F. or below.

Therefore, in another aspect of the inventive subject matter, a method of chilling intake air for a combustion turbine includes a step of combining a cooled air stream with a lean freeze point depressant solution to thereby form a mixture, and subcooling the mixture to a temperature of below 32° F. In another step, so formed rich freeze point depressant solution is removed from the subcooled mixture, and the freeze point depressant solution is regenerated in a regenerator using heat from a power cycle, thereby forming steam. In yet another step, the steam is condensed using LNG-cooled heat transfer fluid.

Most preferably, the cooled air stream is formed by an upstream air chiller that cools ambient air to a temperature of between 35° F. and 55° F., and the lean freeze point depressant solution is sprayed as microdroplets or mist into the cooled air stream. Subcooling will then result in a subcooled mixture having a temperature of between 20° F. and −40° F. Typically, the step of removing the rich freeze point depressant solution is performed in a separator that provides a cooled rich freeze point depressant solution, and/or the cooled rich freeze point depressant solution is heat exchanged with heated lean freeze point depressant solution from the regenerator.

It is still further preferred that the step of regenerating includes a step of providing at least partially expanded steam from a steam cycle to the regenerator to thereby form the steam and heated lean freeze point depressant solution, and that the at least partially expanded steam or condensate is returned from the regenerator to the steam cycle. Most typically, at least one of the cooled air stream and the subcooled mixture is cooled using refrigeration content from the LNG-cooled heat transfer fluid, and the LNG-cooled heat transfer fluid is heated using heat content from the steam from the regenerator.

Various objects, features, aspects and advantages of the present invention will become more apparent from the following detailed description of preferred embodiments of the invention.

DETAILED DESCRIPTION

The inventor has discovered that subcooling of combustion turbine intake air in a power generating plant can be advantageously thermally coupled with an LNG regasification operation. Such configurations are characterized, among other desirable features, by improved and seasonally independent power output and by elimination of external energy requirements for LNG regasification.

In one particularly preferred aspect of processing LNG in a plant, LNG cold is utilized to increase the power generation output and efficiency of a gas turbine in a combined cycle power plant. Most typically, such configurations include a heat transfer fluid circuit that is employed to regasify LNG using the heat content of gas turbine inlet air, and a freeze point depressant solution circuit that prevents ice formation of subcooled (i.e., below 32° F.) inlet air, wherein the freeze point depressant solution is regenerated in the circuit using combustion heat of the gas turbine.

Figure 1:
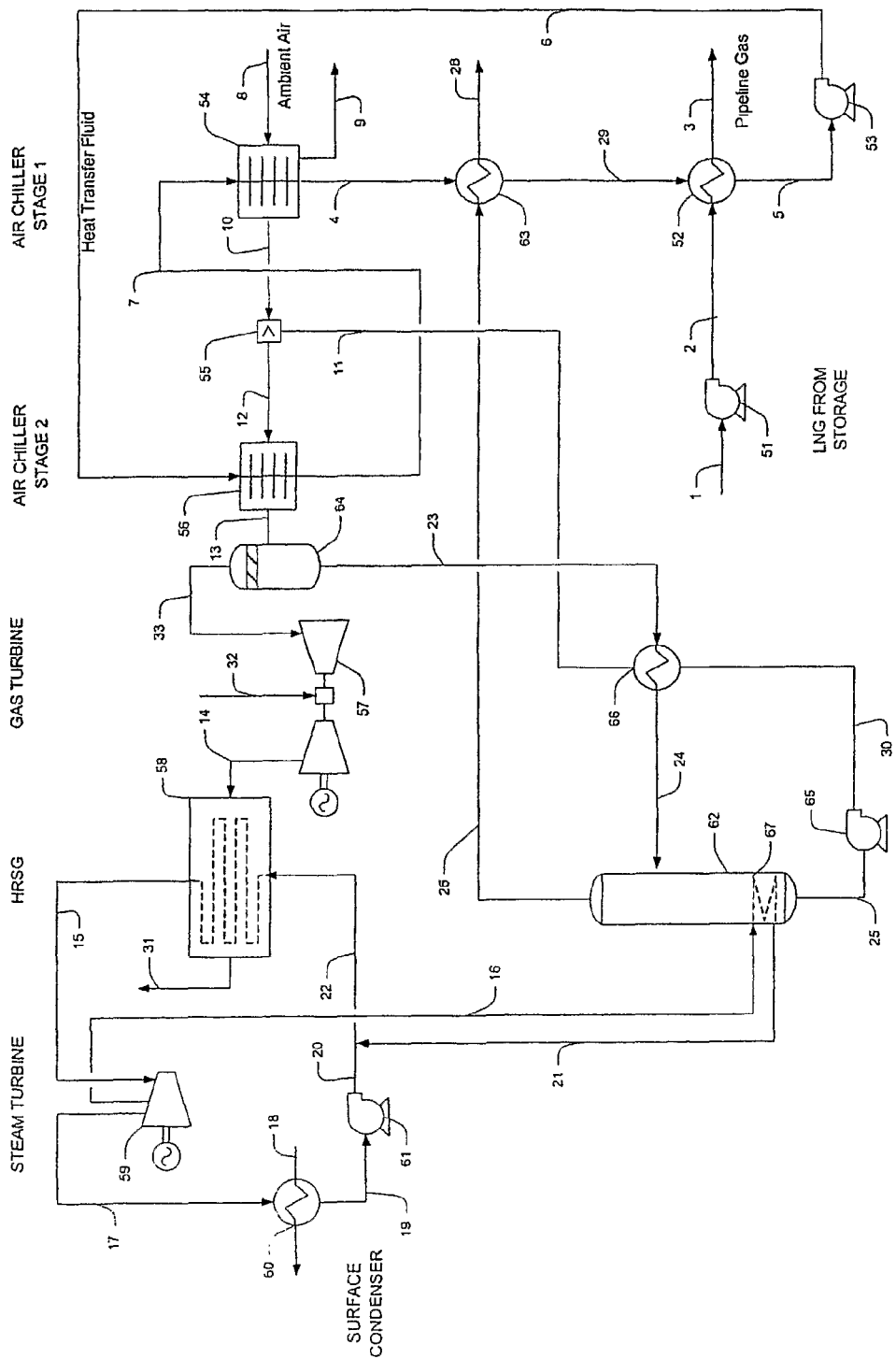
FIG. 1 is an exemplary configuration of an integrated combined cycle plant in which LNG regasification, power generation, and intake air subcooling are thermally integrated.

One exemplary combined cycle plant configuration is depicted in the FIG. 1, where an LNG stream 1 from a storage container, typically at a send-out rate of 1,000 MMscfd, is pressurized by LNG pump 51 to about 1,250 psig forming stream 2. The LNG is then heated in heat exchanger 52 from about −255° F. to about 40° F. or other temperature as required to meet pipeline specifications as stream 3. The heating duty is provided by a heat transfer fluid stream 29, comprising of a glycol water coolant mixture, which is cooled from about 60° F. to about −40° F. The cold glycol coolant stream 5 is pumped by circulating pump 53 to discharge at about 120 psig forming stream 6, which is used in chilling the gas turbine inlet air with the two stage chillers, 54 and 56. The heated glycol water mixture stream 4 from the first stage chiller is further heated with the condensation duty of the glycol regenerator condenser 63 to supplement the heating requirement by the LNG regasification exchanger 52. As used herein, the term "about" in conjunction with a numeral refers to a range of +/−10% (inclusive) of that numeral. For example, the term "about 200 psia" refers to a range of 180 psia to 220 psia, inclusive. Similarly, the term about −40° F. refers to a temperature range of between −44° F. to −36° F.

With the two stage chilling system, the gas turbine intake air stream 8 is chilled from ambient temperature (e.g., 40° F. to 90° F.) to a low temperature (e.g., 0° F. to −20° F., or lower) regardless of ambient temperature and humidity. Thus, it should be especially recognized that unrestrictive and continuous cold air supply can be maintained. Consequently, the power generation efficiency and output can be maximized under all climatic conditions using the two stage air chiller configuration. Most preferably, and as further described below, the chiller configuration has an inter-stage anti-freeze protection using a freeze point depressant solution.

The two stage air chillers system is typically configured with the first air chiller 54 cooling the ambient air stream 8, from typically about 90° F. at 80% relative humidity to about 40° F. to 45° F. forming stream 10 using glycol coolant stream 7 that is supplied at a temperature of about 34° F. to 38° F. While not limiting to the inventive subject matter, it is further preferred that the heat exchange tubes of first stage air chiller 54 are configured to allow free draining of water condensate stream 9 from the exchanger. It should be appreciated that the glycol coolant stream 7 is preferably maintained at above the water freezing point of 32° F., thus avoiding ice formation on the exchanger tubes. This first air chiller reduces the water content in the intake air from about 4.7% to 0.8%, resulting in the removal of about 80% of the water content. The water condensate stream 9 can be recovered as makeup water to the steam system in the combined cycle power plant, or any other portion of the plant as needed.

The chilled air from the first stage chiller 54 (stream 10) is thoroughly mixed with a freeze point depressant solution that is supplied as stream 11 using spray nozzles 55 to thereby form stream 12. Although spray nozzles are generally preferred, other types of mixing devices are also deemed suitable, including a mixing pipe tee, static mixer or other device that creates sufficient turbulence to homogenize the freeze point depressant solution and air mixture. The freeze point depressant solution is preferably a glycol water mixture, methanol, or other suitable agent that has favorable heat transfer characteristic and freeze point depressing properties. The mass flow ratio of the freeze point depressant solution to the air flow will predominantly depend on the particular freeze point depressant solution employed. For example, where the freeze point depressant solution comprises a glycol, the mass flow ratio of the freeze point depressant solution to air (that is the ratio of stream 11 to stream 10), is preferably between 0.005 to 0.01, but can also be as high 0.01 to 0.02 or higher, depending on the type of glycol used and/or extent of freezing depressing level required. Typically, to avoid hydrate formation or freezing of water at −20° F., a mass ratio of freeze point depressant solution to air of about 0.01 is generally adequate. However, higher air temperature exiting from the first chiller (45° F. and above) will typically require additional flow of freeze point depressant solution and the mass ratio of freeze point depressant solution to air must be then increased (e.g., a ratio of 0.015 or higher may be necessary). It should also be noted that excessive use of freeze point depressant solution is in most cases undesirable as it would increase the cost of the anti-freeze system and regeneration unit. Therefore, it is generally preferred that the first chiller cools the ambient air to a temperature of about 55° F. or lower, but above 32° F. (e.g., between 35° F. and 45° F.).

With the use of a freeze point depressant solution, the second air chiller 56 can further chill the air stream 12 from the first stage chiller to below water freezing temperature, typically about 0° F. to about −20° F., or even lower. Also, preferred freeze point depressant solutions (e.g., glycol solvent) will condense and absorb residual water content, and the freeze point depressant solution exits the second chiller as a two phase mixture stream 13. The two phase mixture stream is then separated in separator 64 producing a water laden rich glycol stream 23, and a cold dry air stream 33. The separator is preferably equipped with a demister to remove glycol entrainment and minimize glycol loss. The demister can be a mesh type device or a vane separator, typically constructed of suitable materials for removing micron sized or sub-micron sized entrained liquids without creating excessive pressure drop that would otherwise interfere with gas turbine performance. The water content in the chilled gas stream 33 is typically reduced to about 0.05%. With such removal of water, it should be appreciated that the horsepower required by the compressor section 57 of the gas turbine is also reduced, which in turn improves the power generation efficiency. Fuel is supplied to the combustor as stream 32 (which may or may not be vaporized LNG).

Figure 2:
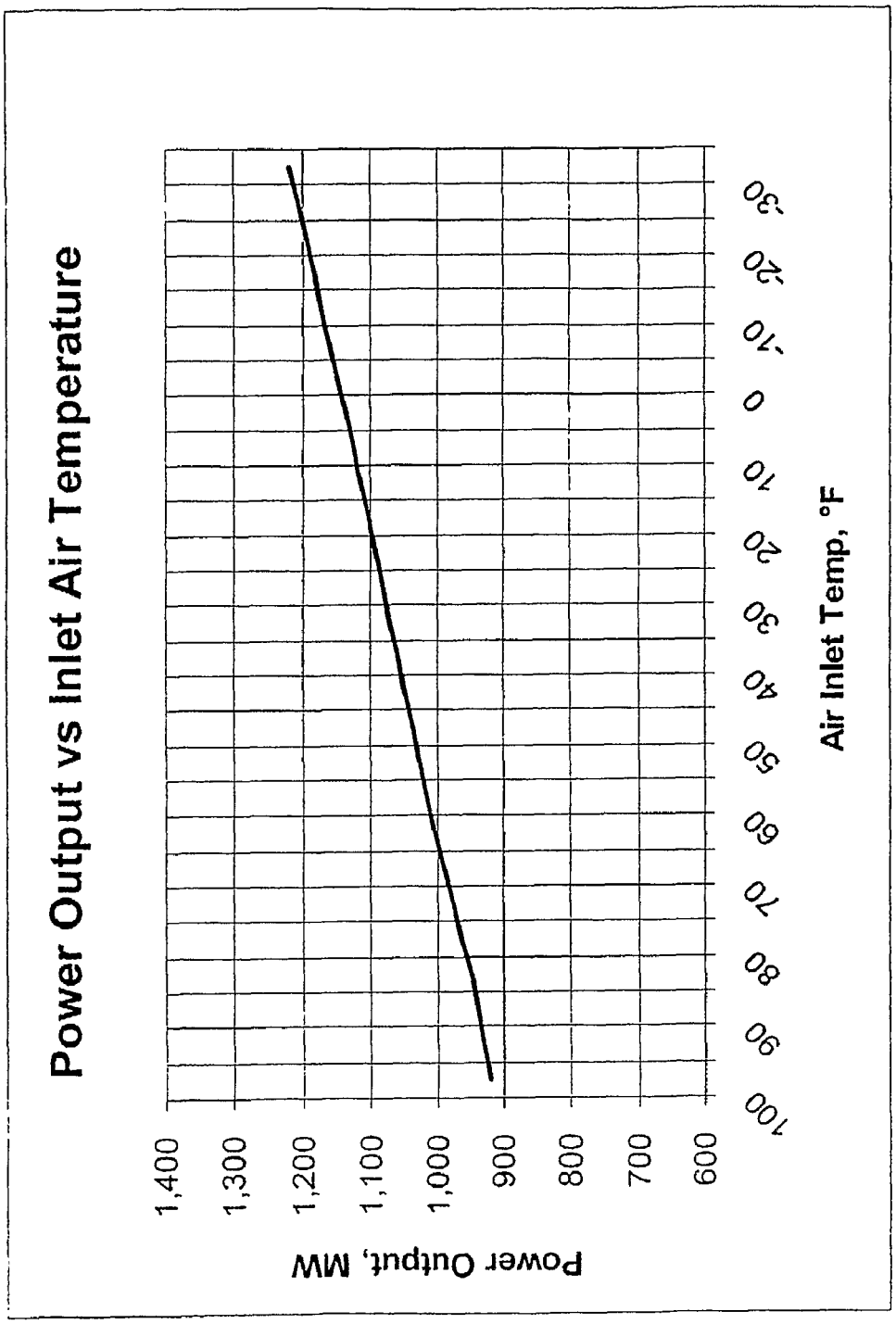
FIG. 2 is a graph illustrating the increase of power output of a combustion turbine generator as a function of inlet air temperature.

When air is chilled to such low temperatures, it should be noted that the mass density of air increases, which results in an increase in air flow (as a gas turbine operates on constant volumetric flow), and which subsequently increases the gas turbine power output. Colder air temperature also reduces the power consumption by the compressor section of the gas turbine, increasing the gas turbine (Brayton Cycle) power generation efficiency. This desirable effect is illustrated in FIG. 2, which shows an exemplary performance graph of a combined cycle power plant with gas turbine inlet cooling according to the inventive subject matter. Typically for every 3 to 5° F. decrease in air temperature, output from the power plant is increased by about 1%. For example, when the ambient air intake temperature is reduced from 100° F. to −20° F. during summer operation, the power output of a combined cycle power plant can be increased by over 33%. As shown in FIG. 2, the power plant output can be increased from 900 MW to 1,200 MW with these air chilling steps. Such 300 MW increase in power output represents a significant increase in power revenue, especially during summer months when the consumer demand peaks and electricity can be sold at a premium. During winter months when the ambient temperatures are lower, the power gain is still significant. For example, when the ambient air intake temperature is reduced from 50° F. to −20° F., over 15% increase in power output can be achieved. In this scenario, as shown in FIG. 2, the power plant output can be increased from 1,050 MW to 1,200 MW with this air cooling step. Such 150 MW increase represents a respectable gain in power production and electric power revenue.

It is generally contemplated that the air-lean freeze point depressant solution mixture is chilled to a temperature of less than 32° F., more typically to about 30° F. to about 10° F., even more typically 10° F. to about −10° F., and most typically −10° F. to about −20° F. Although the chilling temperature is preferably −20° F., the intake air temperature can be further reduced to below −40° F. for additional power output as the LNG is supplied at −250° F. Thus, it should be appreciated that the lower limits are predominantly governed by the LNG regasification send-out rate (that is available refrigeration), practical machine design, aerodynamics, and materials of construction for operating at lower air temperatures.

Rich glycol stream 23 is heat exchanged with the lean glycol stream 30 in exchanger 66 to about 220° F. forming stream 24 prior to entering the glycol regenerator 62. Preferably, a steam heated reboiler 67 is used to strip the water content from the rich glycol. Low pressure steam is supplied as stream 16 from the intermediate stage of the steam turbine 59 in the combined cycle power plant. The condensed steam is returned as stream 21 to the steam boiler system 58 by combining with the condensate pump 61 discharge stream 20 to form combined stream 22. Typically, the glycol concentration of the water laden stream 23 is between 40 to 55% by weight. Lower chilled air temperatures would require a higher glycol concentration to avoid water freezing and hydrate formation. Conversely, a higher air temperature requires less glycol injection as the freezing depression is relaxed.

The stripped water is removed from the glycol regenerator as overhead stream 26 at a temperature of about 240° F. and a pressure of about 10 psig. The significant waste heat that is available in this stream is utilized to preheat the heat transfer stream 4 in exchanger 63 to about 60° F., which advantageously supplements the LNG regasification heating duty. The water condensate 28 from exchanger 63 can be recovered as boiler feedwater makeup to the steam system. The glycol regenerator 62 produces a bottom lean glycol stream 25 that is pumped by glycol pump 65 to form stream 30, which is subsequently heat exchanged with the rich glycol in exchanger 66 prior to being re-used for injection.

The steam boiler system 58 receives heat from combustion exhaust 14, which is cooled to form stream 31. The heated or superheated steam 15 is then expanded in the steam turbine 59 to produce power. A portion of partially expanded steam (typically low pressure steam) is then provided from the steam turbine to the reboiler 67, and further expanded steam 17 is condensed in condenser 60 using coolant stream 18 to form condensate 19. Condensate pump 61 pumps condensate 19 to pressure to form stream 20, which is combined with the reboiler condensate stream 21 to form stream 22.

Therefore, it is contemplated that preferred combined cycle power plants according to the inventive subject matter will include a regenerator that is configured to receive a rich freeze point depressant solution and that is further configured to form steam and a lean freeze point depressant solution from the rich solution. Most preferably, the regenerator is thermally coupled to an LNG-cooled heat transfer fluid circuit such that heat from the steam can be transferred to the heat transfer fluid, and the regenerator is further thermally coupled to a steam cycle such that heat from the steam cycle can be transferred to the rich freeze point depressant solution in the regenerator.

It should be particularly appreciated that previously known configurations and methods were generally limited to chilling intake air to a temperature of 40° F. and above and therefore cannot generate any substantial power increase. In contrast, the configurations presented herein allow chilling of intake air to a temperature of −40° F., which is a substantial increase over currently known methods and configurations technology. Furthermore, it should be noted that the configurations and methods according to the inventive subject matter use waste heat to regenerate the freeze point depressant solution, and provide additional heat for regasification of LNG.

Contemplated power plants will preferably have a two stage chiller that cools the gas turbine inlet air with the use of a heat transfer fluid, and further include an injection device between the two chiller stages for admixture of a freeze point depressant solution with the cooled air. In particularly preferred configurations, LNG cold is used to indirectly cool the gas turbine intake air, to indirectly condense and remove the moisture content from the intake air, and/or to indirectly deep chill the gas turbine inlet air to a temperature to below the water freezing temperature. Most preferably, formation of ice and hydrate is suppressed by injection of the freeze point depressant solution into the air stream that is to be subcooled (e.g., between the first stage and the second stage chillers), thereby providing an unrestricted and continuous cold air supply to the gas turbines. Thus, it is generally preferred that the heat transfer fluid for the air intake chillers and/or the LNG regasification exchanger comprises a solution that is non-freezing at the cryogenic temperature of LNG, and has favorable heat transfer characteristics in chilling intake air. Typically, such fluid comprises a glycol based solvent, and most typically a ethylene glycol-water mixture (e.g., ethylene glycol water mixture with glycol concentration at about 80 wt %). Other solvents are also deemed suitable and include multi component heat transfer fluids, halogenated hydrocarbons, methanol, etc.

Most typically, contemplated configurations will employ the freeze point depressant solution to remove residual water from a first stage chiller, while suppressing water freezing in a second chiller. The so formed water laden freeze point depressant solution is separated form the intake air stream and the antifreeze agent is preferably regenerated using waste steam extracted from the steam cycle in a combined cycle power plant, or flue gas from the gas turbine exhaust. Alternatively, water may also be removed from the intake air in various other manners, and contemplated manners especially include molecular sieves and TEG contactors. In such cases, regeneration of the sorbent is also thermally coupled to the steam cycle.

It should still further be recognized that the configurations contemplated herein are adaptable to variable capacities of LNG send-out and different gas turbine sizes. Moreover, contemplated configurations are also suitable to simple gas turbine cycles with no steam power cycle that are frequently encountered in remote locations where water supply is scarce. In such cases, heat for the regeneration of the freeze point depressant solution is preferably recovered from the gas turbine exhaust. While not limiting to the inventive subject matter, it should be appreciated that contemplated plants can recover the water condensate from the intake air as makeup water to the boiler feed-water system in a steam power plant. Thus, the use of recovered condensate reduces or even eliminates water import to the steam power plant and waste discharges from boiler feedwater treatment plants.

Therefore, a preferred method of chilling intake air for a combustion turbine includes a step of combining a cooled air stream with a lean freeze point depressant solution to thereby form a mixture, which is the subcooled to a temperature of below 32° F. In a further step, rich freeze point depressant solution is removed from the subcooled mixture, and the lean freeze point depressant solution is regenerated in a regenerator using heat from a power cycle to thereby form steam. Preferably, the steam is then condensed using a LNG-cooled heat transfer fluid.

It is also contemplated that thermally integrated configurations contemplated herein result in a significant increase in power output from power plants and a power generation efficiency that far exceeds currently known power generation technologies, while reducing the capital cost of the power generation facilities (e.g., power cost can be reduced by as much as 40%). Additionally, it should be recognized that the configurations presented herein may be implemented in a plant that is built from scratch, or as a retrofit in an existing power plant and/or LNG regasification facility.

Thus, specific embodiments and applications of integrated power production have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Furthermore, where a definition or use of a term in a reference, which is incorporated by reference herein is inconsistent or contrary to the definition of that term provided herein, the definition of that term provided herein applies and the definition of that term in the reference does not apply.

What is claimed is:

1. A thermally integrated regenerator configuration comprising:
   a regenerator configured to receive a rich freeze point depressant solution and further configured to form steam and a lean freeze point depressant solution from the rich solution;
   wherein the regenerator is thermally coupled to an LNG-cooled heat transfer fluid circuit such that heat from the steam can be transferred to the heat transfer fluid; and
   wherein the regenerator is further thermally coupled to a steam cycle such that heat from the steam cycle can be transferred to the rich freeze point depressant solution in the regenerator.

2. The regenerator configuration of claim 1 further comprising an air intake chiller thermally coupled to the LNG-cooled heat transfer fluid circuit, and further fluidly coupled to a mixing device, wherein the mixing device is configured to receive the lean freeze point depressant solution and to allow mixing of the lean freeze point depressant solution with air.

3. The regenerator configuration of claim 2 wherein the air intake chiller is configured to chill the air-lean freeze point depressant solution mixture to a temperature of less than 32° F.

4. The regenerator configuration of claim 3 further comprising a separator that is fluidly coupled to the air intake chiller and that is configured to allow removal the rich freeze point depressant solution from the chilled mixture.

5. The regenerator configuration of claim 2 further comprising a second air intake chiller thermally coupled to the LNG-cooled heat transfer fluid circuit, and further upstream and fluidly coupled the air intake chiller.

6. The regenerator configuration of claim 1 further comprising a heat exchanger that is configured to allow cooling of the lean freeze point depressant solution using refrigeration content of the rich freeze point depressant solution.

7. The regenerator configuration of claim 1 wherein thermal coupling of the regenerator to the steam cycle comprises a circuit that is configured to receive at least partially expanded steam from a steam turbine of the steam cycle, to provide the at least partially expanded steam to a reboiler of the regenerator, and to return the at least partially expanded steam from the regenerator to the steam cycle.

8. The regenerator configuration of claim 1 wherein thermal coupling of the regenerator to the LNG-cooled heat transfer fluid circuit comprises a heat exchanger that is configured to provide heat from the steam to the LNG-cooled heat transfer fluid.

9. The regenerator configuration of claim 1 wherein the LNG-cooled heat transfer fluid comprises a glycol, or a solution with water absorption capacity at a temperature of 32° F. or below.

10. The regenerator configuration of claim 1 wherein the lean freeze point depressant solution comprises a glycol.

11. A method of chilling intake air for a combustion turbine of a combined cycle power plant, comprising:
   combining a cooled air stream with a lean freeze point depressant solution to thereby form a mixture, and subcooling the mixture to a temperature of below 32° F.;
   removing rich freeze point depressant solution from the subcooled mixture, and regenerating the lean freeze point depressant solution in a regenerator using heat from a working fluid of a steam power cycle of the combined cycle power plant, thereby forming steam as overhead product of the regenerator; and
   condensing the steam using a LNG-cooled heat transfer fluid.

12. The method of claim 11 wherein the cooled air stream is formed by an upstream air chiller that cools ambient air to a temperature of between 35° F. and 45° F.

13. The method of claim 11 wherein the step of combining is performed using spraying the lean freeze point depressant solution into the cooled air stream.

14. The method of claim 11 wherein the subcooled mixture has a temperature of between 20° F. and −40° F.

15. The method of claim 11 wherein the step of removing the rich freeze point depressant solution is performed in a separator that provides a cooled rich freeze point depressant solution.

16. The method of claim 15 wherein the cooled rich freeze point depressant solution is heat exchanged with heated lean freeze point depressant solution from the regenerator.

17. The method of claim 11 wherein the step of regenerating includes a step of providing at least partially expanded steam from a steam cycle to the regenerator to thereby form the steam and heated lean freeze point depressant solution.

18. The method of claim 17 wherein the at least partially expanded steam is returned from the regenerator to the steam cycle.

19. The method of claim 11 wherein at least one of the cooled air stream and the subcooled mixture is cooled using refrigeration content from the LNG-cooled heat transfer fluid.

20. The method of claim 11 wherein the LNG-cooled heat transfer fluid is heated using heat content from the steam from the regenerator.

* * * * *